Jan. 24, 1961  F. H. PAGE, JR  2,969,453
WELDING
Filed Aug. 11, 1958  4 Sheets-Sheet 1
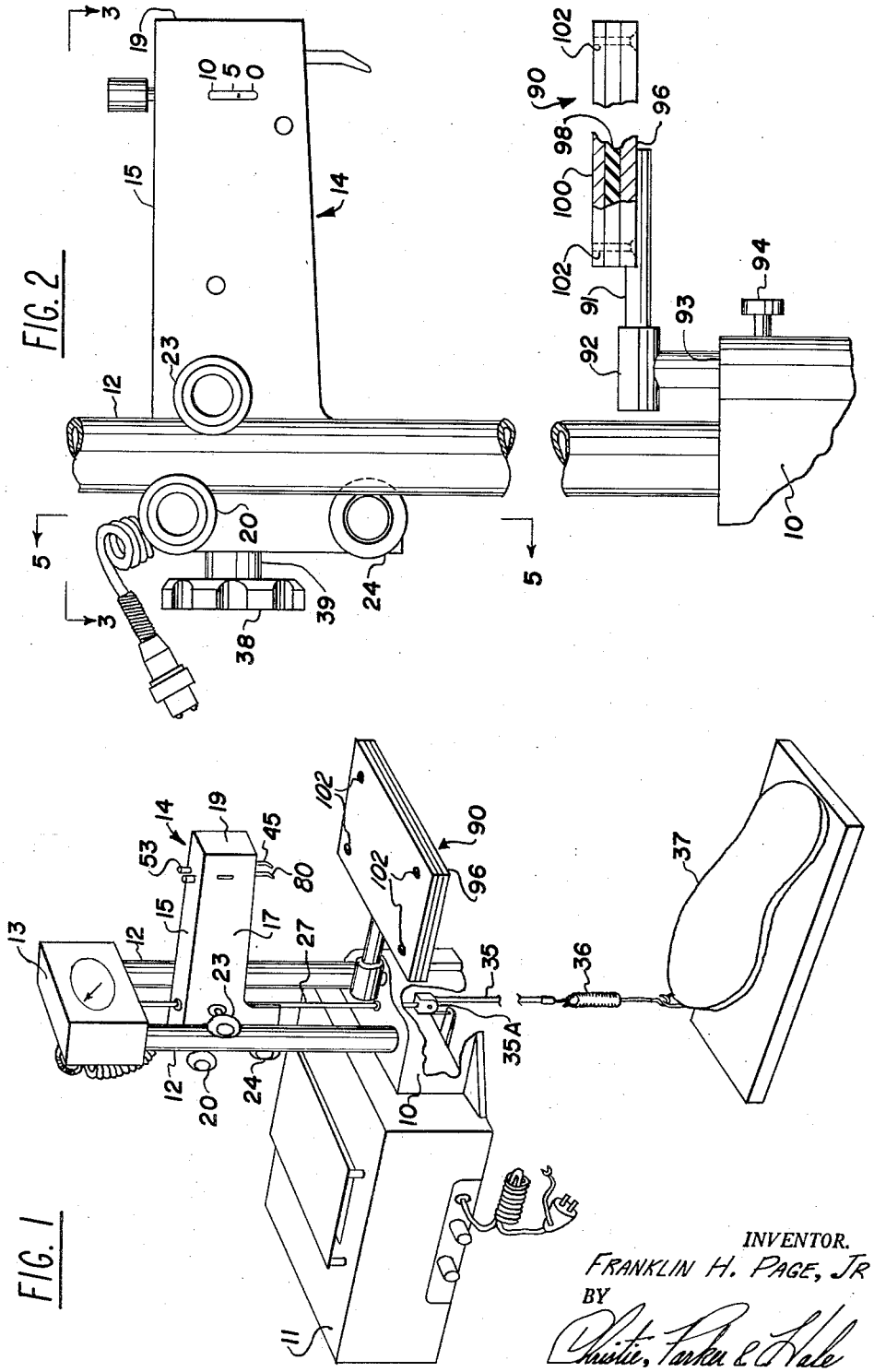
INVENTOR.
FRANKLIN H. PAGE, JR
BY
Christie, Parker & Hale
ATTORNEYS.

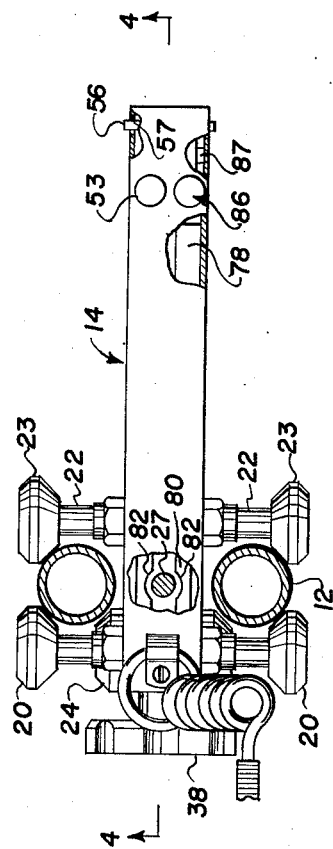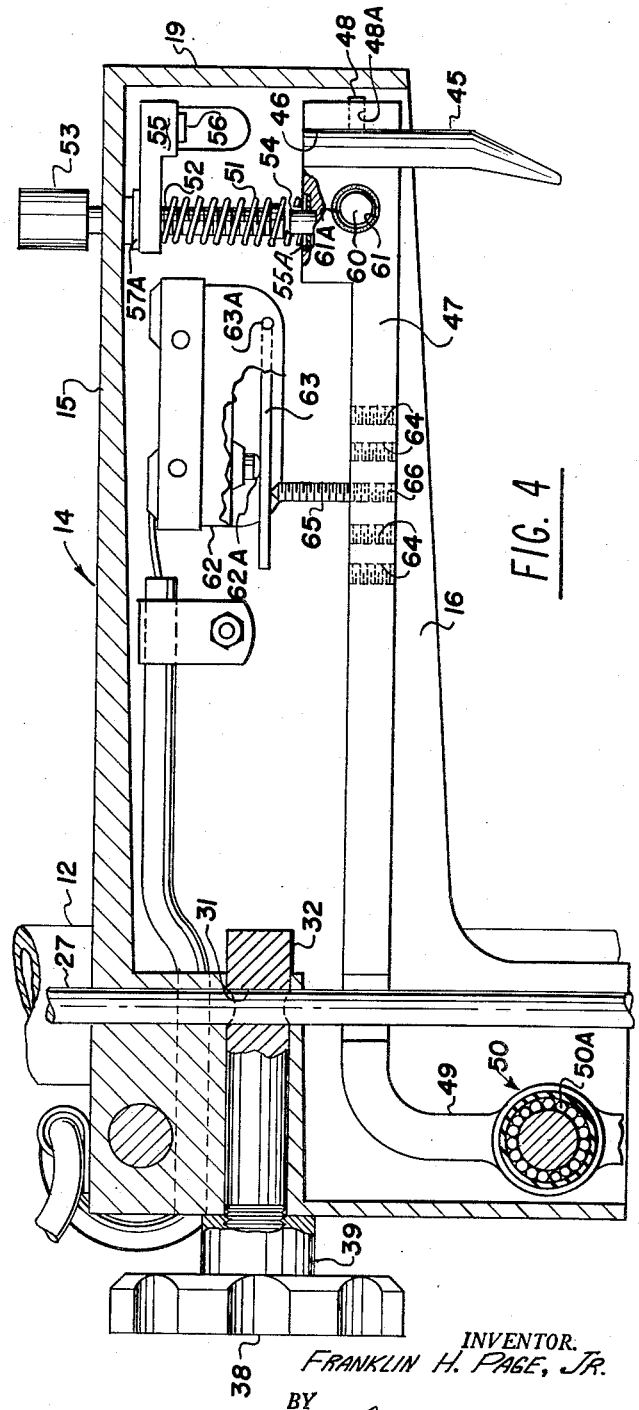

Jan. 24, 1961 F. H. PAGE, JR 2,969,453
WELDING
Filed Aug. 11, 1958 4 Sheets-Sheet 3
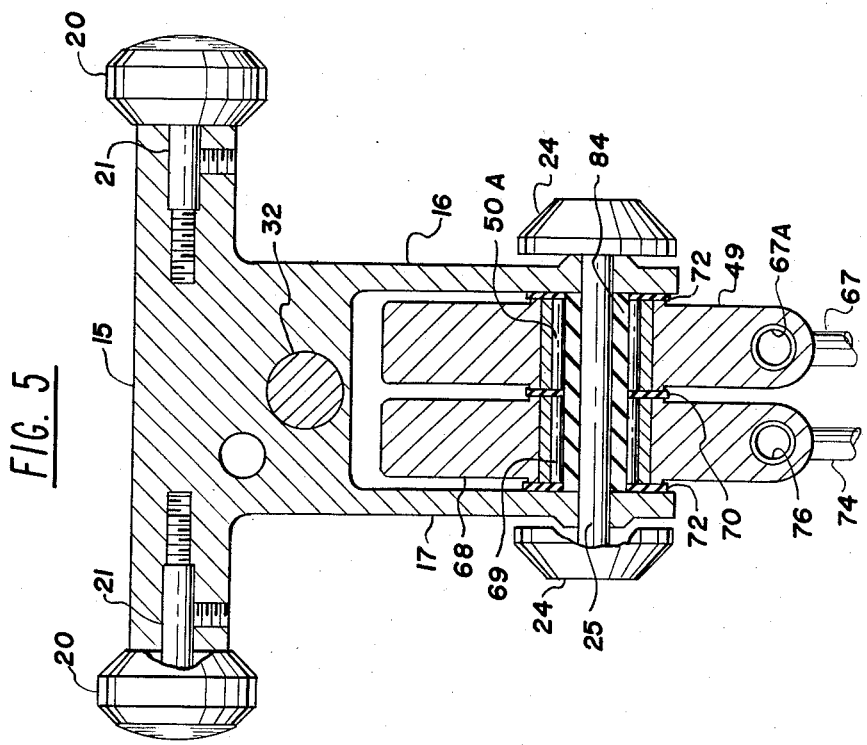
INVENTOR.
FRANKLIN H. PAGE, JR.
BY
Christie, Parker & Hale
ATTORNEYS.

Jan. 24, 1961　　　F. H. PAGE, JR　　　2,969,453
WELDING
Filed Aug. 11, 1958
4 Sheets-Sheet 4
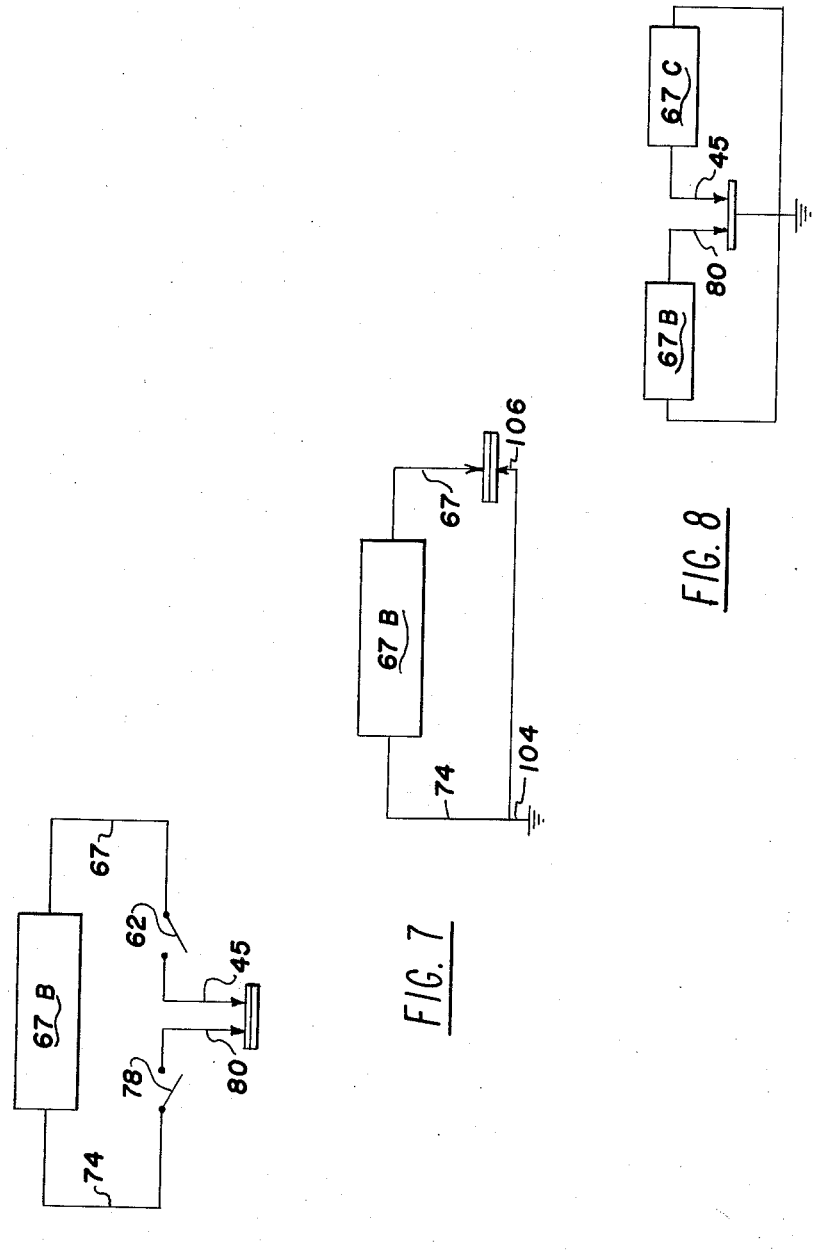
INVENTOR.
FRANKLIN H. PAGE, JR.
BY
Christie, Parker & Hale
ATTORNEYS.

United States Patent Office

2,969,453
Patented Jan. 24, 1961

2,969,453

WELDING

Franklin H. Page, Jr., Arcadia, Calif., assignor to Du Pa Co., Inc., Arcadia, Calif., a corporation of California Filed Aug. 11, 1958, Ser. No. 754,245

2 Claims. (Cl. 219—86)

This invention relates to resistance welding, which is often referred to as "spot welding."

In conventional spot welding, two pieces of metal or "work" to be welded are held together and placed between two electrodes. Ordinarily the electrodes are vertically spaced and the lower electrode is stationary. The work is supported on its lower surface by the lower electrode and the upper electrode is forced down to contact the upper surface of the work. A large welding current is then caused to pass for a short time from one electrode to another through the metal pieces. The high contact resistance between the two pieces of metal coupled with high current density causes an increase in temperature of the two pieces in the vicinity of the electrode tips sufficient to cause the metal to become molten for a brief instant. This causes the two pieces to be fused together in a spot weld.

In some welding jobs it is not convenient or desirable to have the electrodes on opposite sides of the work, and they are therefore positioned on the same side of the work for a "series welding" operation. Series welding is defined as resistance welding in which current passes through two or more weld areas which are in series with each other. In many types of series welding operations it is important to have careful control of the welding current, pressure exerted on the work by the electrodes, and forging action exerted by the electrodes for the brief moment the metal in the weld area is molten. For example, welding components to circuits printed on boards requires close control of all parameters. Contact to the back side is not available, and the areas of the printed conductors are small. The conductor, and usually the component to be added, are of high conductivity and are in the class of materials usually considered to be difficult to weld. To make a satisfactory series weld to a printed circuit board requires that the distance between the electrodes be precisely set and retained from weld to weld. The pressure at each electrode must be capable of precise adjustment and be retained from weld to weld. Also, if a capacitor type power supply is used, it is sometimes desirable to have different pressures at the two different electrodes.

This invention provides a welder with a pair of "floating" electrodes which permit series welding of printed circuits and other jobs previously considered to be commercially impractical. With this welder, welding current, electrode pressure, and electrode spacing are precisely set and retained for repeated operation, thereby insuring satisfactory and uniform welds.

Briefly, the invention provides a spot welder which includes a pair of electrodes mounted on a support to be movable with respect to the support, so when the support and electrodes are advanced toward a piece of work to be welded the electrodes are displaced with respect to the support when they contact the work. A circuit for supplying current to the electrodes is controlled by means operatively responsive to the displacement of the electrodes.

In the preferred form each of the electrodes is independently movable with respect to the support and each includes separately adjustable means for controlling the force required to move each electrode with respect to the support. Also, each electrode has a separate respective switch actuated by the displacement of the electrode. The switches are connected in series to the circuit so welding current is supplied to the electrodes only after the electrodes are displaced a preset amount with respect to the support. This arrangement insures that the welding circuit is not fired until the electrodes are each exerting sufficient pressure on the work.

These and other aspects of the invention will be more fully understood from the following detailed description taken in conjunction with the accompanying drawings in which:

Fig. 1 is a perspective view partly broken away of the preferred embodiment of the invention;

Fig. 2 is a side elevation of the welder support and electrodes of Fig. 1;

Fig. 3 is a view taken on line 3—3 of Fig. 2;

Fig. 4 is a view taken on line 4—4 of Fig. 2;

Fig. 5 is a view taken on line 5—5 of Fig. 2;

Fig. 6 is a schematic diagram of one type of circuit adapted for series welding with the welder of Figs. 1 through 5;

Fig. 7 is a schematic diagram of one type of circuit adapted for making conventional welds with the welder of Figs. 1 through 5; and Fig. 8 is a schematic diagram of one type of circuit adapted for making two simultaneous independent welds with the welder of Figs. 1 through 5.

Referring to Figs. 1 through 5, the spot welder includes a hollow base or column support 10 adapted to be mounted at any convenient height on a table, workbench, etc. A power supply box 11 is attached to the rear of the base. A pair of laterally spaced upwardly extending tubular members or columns 12 are attached at their lower ends to the base. A rectangularly shaped control box 13 is mounted across the upper ends of the columns. A hollow rectangularly shaped head 14 is disposed between the two columns and extends forward of the base in a direction substantially perpendicular to the plane defined by the two columns.

The head has a top wall 15, a right side wall 16 (see Fig. 4), a left side wall 17, a front end wall 19 and is open at its bottom. The head is movably supported at its rear end by a first pair of rotatable guide wheels 20 mounted on the ends of a first pair of outwardly extending horizontal stub shafts 21 formed integrally on opposite sides of the head to the rear of the columns. Each of the wheels is tapered to a reduced thickness at its periphery, and the inner edge of each wheel makes a close rolling contact with the outer rear portion of the proximal respective column. A second pair of outwardly extending stub shafts 22 formed integrally on opposite sides of the head and located slightly below the first shafts and in front of the two columns, are parallel to the first shafts. A second pair of rotatable guide wheels 23 are mounted on the outer ends of the second stub shafts. These wheels are also tapered to reduced cross section at their peripheries, and their inner edges bear against the forward outer portion of the proximal respective column. A third pair of tapered guide wheels 24 are mounted on the outer ends of a horizontal shaft 25 extending through the head directly below the first stub shafts and are parallel to them. Each of the wheels of the third pair rides against the inner rear portion of the proximal respective column. The three sets of wheels minimize any tendency for the head to pivot about a horizontal or vertical axis so that accurate vertical linear motion is obtained as the head is moved along the lengths of the columns. Also, the inboard and outboard arrangement of the wheels effectively cancels the force components tending to move the columns apart or together as the welder is operated. The wheels are made of a suitable insulating material such as Bakelite plastic.

The head is also supported by a pull rod 27 suspended at its upper end in the control box by a compression spring (not shown) disposed around the upper end of the rod so the rod can be pulled downwardly from an original position and then be returned to the original position by the spring. The pull rod extends down through the rear portion of the head, through a vertical bore 31 in a headlocking shaft 32 which extends horizontally and rearwardly out the rear of the head, and down out the open bottom of the head. One end of a cable 35 is attached to the interior of the base and extends up over a pulley 35A which is attached to the lower end of the pull rod. The cable extends down to a hook spring arrangement 36, which is attached to the forward end of a conventional foot pedal 37 to prevent mechanical overloading of the welder.

A headlocking knob 38 made of insulating material and having an internally threaded shoulder 39 is threaded onto the rear end of the headlocking shaft so that the shoulder bears against the rear of the head, which is locked to the pull rod by turning the headlocking knob to cause the locking shaft to be pulled in a rearward direction. This forces the pull rod against the head so that the head is supported by the pull rod and guided by the guide wheels to move in a vertical direction.

Referring to Fig. 4, a first or right electrode 45 is supported in a vertical bore 46 at the forward end of a right horizontal electrode arm 47. The right electrode is adjustably held in its bore by a horizontal set screw 48 threaded into a lateral bore 48A which opens into vertical bore 46. The rear end of the right electrode arm has a downwardly extending projection 49 which is pivoted at 50 about the central part of the third guide shaft (see Fig. 5) on a needle bearing 50A, so the arm can move in a vertical plane with minimum friction. The right electrode is set so its lower tip is in the horizontal plane passing through the pivot point of the right arm, i.e., in the plane which is perpendicular to the direction of head movement and which passes through the pivot point. With this arrangement, there is a minimum amount of "wiping" or relative motion of the electrode tips during the pressure and welding cycles. This permits welding of small and delicate components, and prevents the rolling of wire or other curved components which are to be welded.

The outer or forward end of the right electrode arm is urged downwardly by a vertical compression spring 51 coaxially disposed about a vertical and externally threaded pressure regulating shaft 52. A pressure regulating knob 53 is attached to the upper end of the shaft 52, which extends up through the top wall of the head. The lower end of the shaft terminates just above a vertical insulating pin 54 mounted on the upper surface of the right electrode arm. The compression spring bears against a spring guide 55 at its upper end and against an insulator washer 55A on the upper surface of the right electrode arm at its lower end. A laterally extending regulator pointer 56 on the forward end of the spring guide extends into a vertical slot 57 (see Fig. 3) in the right side wall of the head. When the pressure regulating shaft is rotated by means of the knob 53, a bearing flange 57A formed integrally with it bears against the underside of the top of the head and prevents the shaft from moving up. The shaft 52 is threaded through the spring guide and forces the guide to travel up or down depending on the direction of rotation of the shaft. The spring guide is prevented from rotating with the shaft by the indicator which lies in the slot of the head wall. The position of the spring guide determines the amount of pressure load which is applied to the end of the right electrode arm. The indicator on the spring guide moves up and down adjacent the vertical slot on the outside surface of the head wall to indicate the force exerted by the spring on the arm.

A horizontal stop pin 60 (see Fig. 4) extends from the right side wall of the head into a horizontal bore 61 in the forward end of the right electrode arm. An electrically insulated bushing 61A is press-fitted in bore 61, and is of sufficiently large internal diameter to permit the right arm a limited amount of travel in a vertical direction.

A firing switch 62, preferably a microswitch with a contact button 62A, is attached to the inner surface of the right side wall of the head just to the rear of the pressure regulating shaft (see Fig. 4). One end of a rearwardly extending lever arm 63 is pivotally attached at 63A to the forward part of the microswitch. The lever arm overlies five longitudinally spaced and internally threaded vertical bores 64 in the right electrode arm. A first screw 65 is threaded into the middle bore and has its upper end terminating at the microswitch lever. A second set screw 66 is threaded into the lower portion of the middle bore and serves to lock the first set screw. The set screws may be placed in any of the bores to provide the desired amount of travel of the electrode arm with respect to the head to reset the switch. For most welding operations this travel should be about .020". The operation of firing switch 62 is described below with reference to Fig. 6.

One end of a heavy flexible conductor 67 is connected in a heli-coil insert 67A formed in the downwardly extending portion of the electrode arm beneath the pivot bearing (see Fig. 4). The other end of the conductor 67 is connected to a power supply 67B as shown in Fig. 6.

A second or left electrode arm 68 identical in size and shape to the right electrode arm is mounted on a needle bearing 69 on the shaft 25 alongside the right electrode arm. The two electrode arms are free to pivot independently of each other, and are spaced and electrically insulated from each other by a central insulating washer 70. The electrode arms are insulated from their proximal respective side walls of the head by electrical insulating side washers 72 disposed around the shaft 25 and located between each of the side walls and the nearest side of the respective electrode arm. One end of a second heavy flexible conductor 74 is connected in a heli-coil insert 76 in the downwardly extending projection of the left electrode arm below the pivot (see Fig. 5). The other end of the second conductor 74 is connected to the power supply as shown in Fig. 6.

A second microswitch 78 (shown schematically in Fig. 6) is mounted on the left side wall of the head in exactly the same way as the first microswitch is mounted on the right side wall of the head. The left electrode arm actuates the microswitch exactly as previously described for the right arm. The left electrode arm includes a downwardly extending second electrode 80 (shown schematically in Fig. 6) which is supported at the outer end of the left electrode arm in exactly the same manner as previously described for the electrode on the right arm. Each of the electrodes are bent at their lower ends so that by rotating each electrode in its respective arm, the spacing between the electrode tips can be varied.

As shown in the broken away portion at the rear end of the head in Fig. 3, the electrode arms are disposed on opposite sides of the pull rod, and have cut-away portions 82 where the pull rod passes between them to avoid inadvertent electrical contact with the pull rod.

Each of the electrode arms is insulated from the shaft on which they are mounted to pivot by an insulating bushing 84 disposed around the shaft and inside each of the needle bearings.

The assembly for the left electrode arm includes a spring loading mechanism 86 and travel limiting stop arrangement 87 identical with those described for the right electrode arm.

Preferably the electrode arms are made of lightweight metal in order to provide arms of low inertia so that the spring loading of the arms will cause them to force the electrodes downwardly instantly as the metal of the work becomes molten. This action is important to provide proper forging of the molten metal in order to obtain a strong weld. We have found that a 24S–T4 aluminum alloy (93.4% Al, 4–5% Cu, .6% Mn, 1.5% Mg) which has been copper-plated, is well suited for construction of the electrode arms because it has the three following advantages: (1) It is lightweight and therefore provides an arm of low inertia; (2) Aluminum and its alloys have a low specific resistance which is desirable for the conduction of high currents used in spot welding; (3) Aluminum which has heretofore been unsatisfactory for this purpose due to its high surface and contact resistance is well suited when provided with a copper plating. Other lightweight alloys can also be employed; for example, magnesium and its alloys may be used satisfactorily. Any of the lightweight alloys so used which tend to form surface films of high resistance should be plated with a suitable material; e.g., copper, which forms a protective, low-resistance coating. The terms "lightweight metal" and "lightweight metal alloys" are used to include those materials of relatively low specific gravity, as compared to metals which are normally used in welding equipment. For example, iron and copper, which are normally used, have specific gravities of about 8, while the magnesium and aluminum alloys have specific gravities ranging from about 1.7 to 3.0. The lightweight materials should have a resistivity of about that of magnesium (e.g. 5 micro-ohm-cm.) or less.

Referring to Figs. 1 and 2, a work support platform 90 is mounted at the forward end of a horizontal platform arm 91 attached at its rear end to the base by a support 92 which extends down into a vertical bore 93 in the central and forward portion of the base. A threaded locking knob 94 extends horizontally through the base and serves to lock the platform arm in any desired height or position.

The work support platform is of a sandwich construction and includes a bottom layer 96 welded directly to the platform arm and made of a conductive material such as copper. A middle layer 98 of an insulating material such as glass is on the bottom layer, and an upper layer 100 is cemented to the upper surface of the insulating layer. The upper layer is also of a conducting material such as copper. If desired, the middle insulating layer may be a ceramic enamel fired on one side of the upper layer. The upper two layers are secured to the bottom layer by four nylon screws 102, the upper conductive plate being tapped. There are clearance holes in the insulating layer and in the bottom layer to accommodate the screws.

The work support platform can be used in the three following ways:

(1) For some series welding, the upper conductive plate provides a conductive path from the area of one weld to that of another. This is especially useful when the lower material to be welded is of a thin or of high resistivity or of relatively small area.

(2) For some cases, a possible short circuit through the support is undesirable. An example is a printed circuit with "plated through" holes, or with any other connection between the two sides of the circuit. In these cases the assembly of the two upper layers are turned over from the position shown in Figs. 1 and 2 so that the work rests directly on the insulating layer.

(3) When it is desired to use the welding apparatus with only a single upper electrode, the upper two layers of the platform support are removed, leaving only the grounded bottom layer.

In using the welder for a series weld operation in which it is desired to have a conductive support plate, the welder is set up as shown in Figs. 1 and 2, and the welding circuit is set as shown in the schematic diagram of Fig. 6. A series weld is made with the apparatus as follows: The force required to displace each of the electrode arms is independently set by adjusting the respective compression springs above each arm with each of the pressure regulator knobs. The height of the head is adjusted by means of the head locking coupling to the proper position on the pull rod so that work to be welded can easily be slipped in between the two electrodes and the platform, and so that the head does not need to move more than about one inch to effect the weld. With the work held in position on the platform, pressure is applied to the foot pedal, causing the pull rod to move down. This carries the head and electrode arms down so the two electrode tips contact the work at the desired points. As the head continues to move down, each of the electrode arms pivots upwardly with respect to the head. When sufficient force is being exerted by each of the tips, the arms are deflected with respect to the head to actuate their respective firing microswitches.

As shown in Fig. 6, the microswitches are connected in series so that no welding current can pass through the work until both switches are actuated. This avoids any firing when one or the other of the electrodes is not exerting sufficient pressure. The arrangement does not positively prevent one of the electrodes from reaching an excessively high pressure, but experience has indicated that this is not often a problem. Greater difficulty is encountered with under-pressure firing, which often causes "blowing out" and damage of the work to be welded. Over pressure may sometimes result in a weaker weld, but is rarely, if ever, destructive of the work. The three sets of wheels on the head insure accurate, vertical movement of the head while pressure is applied to the electrode arms.

After both switches are actuated, causing current to flow and effect the weld, pressure is removed from the foot pedal, and the microswitches automatically open and reset for another operation. For simplicity, the microswitches are shown schematically as carrying the welding current. In actual practice, each microswitch operates a respective relay (not shown) which carries the welding current.

As can be seen from the foregoing explanation, the welder is fired only by the application of a predetermined welding force to the electrode arms, and is unaffected by the weight of the work or by the weight of any jigs which might be used to hold the work. The operator need not worry about firing control because the welder fires automatically when the proper force is reached. The firing pressure is also independent of the electrodes or head adjustments because the firing switches are actuated only by the deflection of their respective arms with respect to the head after the electrodes have contacted the work.

A welder constructed in accordance with this invention has versatility which extends over a wide range of materials and thicknesses. Equally satisfactory results have been achieved with work ranging from the fusing of two 0.0008" diameter wires up to 2 sheets of 20-gauge mild steel. Also, the low inertia of the electrode arms permits successive welds on copper and other materials such as tungsten, which have generally been considered to be impractical for spot welding.

As shown schematically in Fig. 7, the welding circuit can be set by switches (not shown) so one side of the power supply is grounded at 104 to the welder base. This auxiliary connection allows the welder to be converted to conventional use by removing the left electrode, and inserting a conventional lower electrode 106 in place of the platform shown in Figs. 1 and 2.

Fig. 8 shows the welding circuit set for "parallel weld" operation, which is a unique feature of the welder of this invention. A second power supply 67C used in this arrangement is provided so that each of the upper electrodes is furnished power from a separate source, thus making possible two simultaneous independent welds using different pressure settings and different heat (welding current) settings. An example of such use is the welding of two small components to a major component. The independent force sensing mechanism for each electrode provides for the independent initiation of welding current through the electrodes in response to the pressure exerted by each electrode.

Obvious modifications employing the principle of this invention may be used to achieve equivalent results. For example, the electrodes carried by the movable head may be movably mounted on a non-movable support, and the work be mounted on a movable table which is advanced toward or moved away from the electrodes to effect the necessary electrode contact and displacement to actuate the welder.

I claim:

1. A spot welder comprising a support, a first electrode mounted on the support, a second electrode mounted on the support, each of the electrodes being movable with respect to the support so when the support and electrodes are advanced toward a piece of work to be welded the electrodes are displaced with respect to the support when they contact the work, a circuit for supplying current to the electrodes, a first switch responsive to displacement of the first electrode, and a second switch responsive to displacement of the second electrode, the switches being connected in series in the circuit so both must be actuated for the circuit to supply current to the electrodes.

2. A spot welder comprising a support, a first electrode mounted on the support, a second electrode mounted on the support, each of the electrodes being movable with respect to the support so when the support and electrodes are advanced toward a piece of work to be welded the electrodes are displaced with respect to the support when they contact the work, a circuit for supplying current to the electrodes, a first switch responsive to displacement of the first electrode, a second switch responsive to displacement of the second electrode, the switches being connected in series in the circuit so both must be actuated for the circuit to supply current to the electrodes, and means for independently adjusting the force required to displace each of the electrodes.

References Cited in the file of this patent

UNITED STATES PATENTS

| | | |
|---|---|---|
| 1,123,558 | Lachmann | Jan. 5, 1915 |
| 1,536,838 | Geisenhoner | May 5, 1925 |
| 2,046,131 | Powell et al. | June 30, 1936 |
| 2,394,822 | Teplitz | Feb. 12, 1946 |
| 2,480,678 | Skudre | Aug. 30, 1949 |
| 2,872,564 | Du Fresne et al. | Feb. 3, 1959 |
| 2,889,446 | Gartner et al. | June 2, 1959 |